United States Patent
Koschberg et al.

(10) Patent No.: US 8,468,933 B2
(45) Date of Patent: Jun. 25, 2013

(54) DEVICE FOR THE PREPARATION OF DRINKS ON BOARD AN AIRCRAFT

(75) Inventors: Stefan Koschberg, Osteebad Nienhagen (DE); Marco Mundt, Helligengrabe (DE)

(73) Assignee: Airbus Operations GmbH, Hamburg (DE)

( * ) Notice: Subject to any disclaimer, the term of this patent is extended or adjusted under 35 U.S.C. 154(b) by 619 days.

(21) Appl. No.: 12/640,831

(22) Filed: Dec. 17, 2009

(65) Prior Publication Data

US 2010/0154650 A1    Jun. 24, 2010

Related U.S. Application Data

(60) Provisional application No. 61/203,247, filed on Dec. 19, 2008.

(30) Foreign Application Priority Data

Dec. 19, 2008  (DE) .......................... 10 2008 064 121

(51) Int. Cl.
*A47J 31/44*   (2006.01)

(52) U.S. Cl.
USPC ................................. 99/295; 99/321; 99/322

(58) Field of Classification Search
USPC ................ 99/295, 302 R, 322, 321, 319, 317
See application file for complete search history.

(56) References Cited

U.S. PATENT DOCUMENTS

| | | | | |
|---|---|---|---|---|
| 1,785,878 A | * | 12/1930 | Schachter | 99/295 |
| 3,160,326 A | * | 12/1964 | Sturdevant et al. | 222/183 |
| 3,765,574 A | * | 10/1973 | Urquiza | 222/183 |
| 3,908,530 A | * | 9/1975 | Simon et al. | 99/307 |
| 4,033,248 A | * | 7/1977 | DiSalino | 99/281 |
| 4,748,901 A | * | 6/1988 | Burmeister | 99/306 |
| 5,295,609 A | * | 3/1994 | Robbins, III | 220/710 |
| 7,487,712 B2 | * | 2/2009 | Bowden et al. | 99/295 |
| 7,806,044 B2 | * | 10/2010 | Lin | 99/321 |
| 2005/0183580 A1 | * | 8/2005 | Kaminishi et al. | 99/284 |

FOREIGN PATENT DOCUMENTS

| | | |
|---|---|---|
| DE | 624397 | 1/1936 |
| DE | 20 2006 001 296 U1 | 7/2006 |
| WO | WO 2005/060799 | 7/2005 |
| WO | WO 2007/096000 | 8/2007 |

* cited by examiner

*Primary Examiner* — Reginald L Alexander
(74) *Attorney, Agent, or Firm* — Krieg DeVault LLP

(57) ABSTRACT

A galley drink preparation device (252) for the preparation of drinks on board an aircraft comprises a water supply device (360, 364) and at least one pot (10). In the pot (10) there is provided an inlet opening (40) for supplying water from the water supply device (360, 364) into the pot (10). Furthermore, the pot (10) has a receiving region (12) for receiving the drink to be prepared in the galley drink preparation device (252). Additionally present in the pot (10) is a holding device (22) which is arranged, in relation to a flow direction of the water supplied to the pot (10) by the water supply device (360, 364), downstream of the inlet opening (40) and is adapted to receive a coffee pad (32).

12 Claims, 2 Drawing Sheets

DEVICE FOR THE PREPARATION OF DRINKS ON BOARD AN AIRCRAFT

CROSS REFERENCE TO RELATED APPLICATIONS

The present application claims priority to German Patent Application No. 10 2008 064 121.9, filed Dec. 19, 2008 and claims the benefit of U.S. Provisional Patent Application No. 61/203,247, filed Dec. 19, 2008, each of which is incorporated herein by reference.

The invention relates to a device for the preparation of drinks on board an aircraft, which is part of a galley of the aircraft.

BACKGROUND

In passenger aircraft, there is a need to provide the passengers with various cold and hot drinks. At present, devices used to prepare coffee on board an aircraft usually comprise a water tank, in which the water required for the coffee preparation is heated and stored. Furthermore, conventional aircraft galley coffee preparation units have a swing-out or pull-out receiving element for receiving a coffee pad. For the preparation of coffee, heated water is supplied from the water tank to the coffee pad received in the receiving element of the coffee preparation unit. After the water has flown through the coffee pad, the prepared coffee is led into a pot positioned under the receiving element. This kind of hot-drinks preparation has the disadvantage that it is often necessary to remove the still-hot coffee pads from the receiving element of the coffee preparation unit, since the crew members normally have to use the coffee preparation unit several times immediately after one another for the preparation of coffee, in order to be able to serve all the passengers without delays. This can lead to accidents.

SUMMARY

The invention is directed at the object of providing a galley drink preparation device for the preparation of drinks on board an aircraft which is simple and safe to operate and flexible in use.

The galley drink preparation device for the preparation of drinks on board an aircraft according to the invention comprises a water supply device and at least one pot. In the pot there is provided an inlet opening for supplying water from the water supply device into the pot. Furthermore, the pot has a receiving region for receiving the drink to be prepared in the galley drink preparation device. Additionally present in the pot is a holding device which is arranged, in relation to a flow direction of the water supplied to the pot by the water supply device, downstream of the inlet opening and is adapted to receive a coffee pad.

In the galley drink preparation device according to the invention, the coffee preparation can take place completely in the pot of the galley drink preparation device, hot water being able to be supplied from the water supply device to the pot through the inlet opening of the pot. This hot water can flow through the holding device of the pot and a coffee pad received therein. After the supply of a desired quantity of hot water from the water supply device into the pot, the pot can be removed from the galley drink preparation device together with the coffee pad. If desired, the coffee pad can be removed from the pot immediately after the coffee preparation or can remain in the pot during serving. This can help to avoid accidents when removing a hot coffee pad immediately after the coffee preparation, since the pot can be transported together with the coffee pad to a place of disposal for the coffee pad or the coffee pad can be disposed of when in its cooled state, after serving. Furthermore, the galley drink preparation device according to the invention can also be utilised simply for hot-water preparation or for the preparation of other hot drinks, such as tea for example, since all that is required is for no coffee pad to be placed in the holding device of the pot.

The term "coffee pad" is to be understood here as meaning a filter pad which is permeable to liquids and filled with ground coffee powder. The filter pad can have any desired geometrical shape. Preferably, the filter pad is circumferentially closed, so that the coffee powder received in the filter pad cannot escape. For this, it is conceivable, for example, for the coffee pad to be circumferentially sewn in or the filter material to be circumferentially bonded in the border region of the coffee pad with a waterproof, food-safe adhesive.

The pot of the galley drink preparation device can thermally insulate a hot drink, received in the pot, from the pot environment, so that, similar to a Thermos pot, the temperature of the hot drink in the pot can be kept at a desired temperature level for a certain period of time. Furthermore, the pot of the galley drink preparation device can be formed from a shockproof and breakproof material, so that there is no risk of injury to passengers and crew members caused by splinters from the breakage of the pot if it inadvertently falls down.

According to an advantageous embodiment of the galley drink preparation device, the pot has a spout which is shaped and arranged in such a manner that the drink received in the receiving region of the pot is led past the holding device and the coffee pad received in the holding device when being poured out of the pot. When the drink is being poured out of the pot, the volume of the drink in the pot decreases. Therefore, the inlet opening of the pot, which serves for supplying water from the water supply device into the pot during the drink preparation, performs the function of an air inlet into the pot when the drink received in the pot is being poured out through the spout of the pot, through which air inlet air flows from the pot environment into the receiving space of the pot. The reduced volume of drink due to the pouring-out can thus be compensated for by the air entering through the inlet opening during the pouring-out of the drink. The creation of a negative pressure in the pot can thus be avoided, so that uniform pouring-out of the drink through the spout of the pot is possible.

The spout of the pot can be formed in a border region of a top part of the pot. The top part of the pot can be arranged, in relation to the flow direction of the water supplied to the pot by the water supply device, upstream of the receiving region of the pot for receiving the drink to be prepared in the galley drink preparation device. In addition, the top part of the pot can receive the holding device for receiving the coffee pad. According to this construction of the pot, water supplied from the water supply device to the pot through the inlet opening in the pot passes firstly into the region of the pot in which the holding device is received in the top part, flows through a coffee pad received in the holding device and passes as prepared coffee into the receiving region of the pot.

It is conceivable for the holding device to comprise a border region and an inner region connected to the border region by a side-wall region. The inner region and optionally the side-wall region of the holding device can be shaped in such a manner that the shape of the holding device corresponds to the shape of the coffee pad to be received. For example, if the coffee pad is rectangular or square, then at least the inner region of the holding device can likewise be of rectangular or square configuration. A round coffee pad is equally conceivable. Corresponding to the round coffee pad, thus, at least the inner region of the holding device would preferably be of circular configuration.

The holding device can preferably be positioned in two different positions in the pot and preferably also be removed from the pot. In a first position, the holding device is preferably positioned in such a manner that the inner region is lowered relative to the border region for receiving a coffee pad. In a second position, the holding device is positioned, in contrast, in such a manner that the inner region is raised relative to the border region. If the holding device is removed from the pot, an opening to the receiving space of the pot is freed, thereby enabling easy cleaning of the pot and the holding device. When the holding device is positioned in its second position, it can be utilised to fix a tea bag in the pot of the galley drink preparation device. The ability of the holding device to be positioned differently in the pot thus simplifies a versatile use of the galley drink preparation device for preparing coffee and tea. Since the drinks preparation takes place completely in the pot, it is possible to prepare both coffee and tea at the same time in a galley drink preparation device. All that is required for this is to equip the galley drink preparation device with a plurality of pots.

It is furthermore conceivable for the top part of the pot to comprise a web which supports the border region of the holding device when the holding device is received in the top part in its first or its second position. This web can be configured in the form of a continuous web extending along the entire circumference of the holding device. It is, however, also conceivable for the web for supporting the border region of the holding device in the top part of the pot to be formed merely in certain sections. Furthermore, it is advantageous when the border region of the holding device is shaped to correspond to the region, formed in the top part, for receiving the holding device and/or to correspond to the configuration of the web in the top part.

In an advantageous embodiment, the holding device of the pot is provided with a passage in its inner region. When the holding device is positioned in the pot in its first position, the passage of the holding device can perform the function of an outlet, through which water supplied from the water supply device to the pot and, for example, after flowing through a coffee pad received in the holding device, leaves the holding device as prepared coffee in the direction of the receiving region of the pot. Advantageously, the inner region of the holding device is configured in such a manner that it tapers from its side-wall region towards the passage when the holding device is positioned in its first position, since this promotes a draining of water or prepared coffee from the holding device. When the holding device is positioned in its second position in the top part of the pot, the passage of the holding device can be utilised for fastening a tea bag.

According to an embodiment particularly advantageous for tea preparation in the pot, the holding device is provided with a slot which extends from the border region through the side-wall region and the inner region to the passage. For the preparation of tea in the pot, the holding device can be removed from the pot, a tea-bag string connected to a tea bag can be guided through the slot into the passage in order to be fastened to the passage. The tea bag can be fastened to the passage in such a manner that it hangs into the receiving region of the pot when the holding device is positioned in the pot in its second position.

According to an advantageous development, the holding device has a tubular projection surrounding the passage, which projection extends, in relation to a flow direction of the water supplied to the pot by the water supply device, upstream of the inner region of the holding device when the holding device is positioned in its second position. As already explained, the holding device positioned in its second position can be utilised for fastening a tea bag when preparing tea in the galley drink preparation device. Particularly advantageously, the tea-bag string can be fastened to the tubular projection surrounding the passage. For this, it is conceivable for the slot provided in the holding device to extend into the tubular projection. The tea-bag string can thus be guided from the border region of the holding device into the passage of the holding device and wound around the tubular projection surrounding the passage. Since the holding device can be removed from the top part of the pot, the tea bag which hangs into the receiving region of the pot and is fastened to the passage of the holding device by its tea-bag string can be removed in a simple manner together with the holding device after the tea infusion time. Furthermore, one or more tea bags can be fastened to the holding device, as desired.

According to a further advantageous embodiment, the pot of the galley drink preparation device comprises a lid which is pivotably fastened to the pot in such a manner that it covers the holding device in its closed state. Preferably, the inlet opening for supplying water from the water supply device into the pot is formed in the lid. Consequently, the lid can remain in its closed state during the drinks preparation. Thus, when removing a pot filled with prepared coffee from the galley drink preparation device, inadvertent touching of the coffee pad which is still hot immediately after the coffee preparation can be avoided. Furthermore, in its closed state the lid assists the heat-retaining function of the pot. Opening of the lid during the drinks preparation on board the aircraft is thus only necessary in order to position the holding device in the desired position in the pot and/or receive a coffee pad or one or more tea bags in the pot or remove them from the pot.

It is advantageous when the inlet opening formed in the lid is shaped and arranged in such a manner that the tubular projection formed on the holding device is receivable in the inlet opening when the holding device is positioned in its second position and the lid is closed. Thus, the water supplied to the pot through the inlet opening formed in the lid passes directly into the tubular projection formed on the holding device and, in relation to a flow direction of the water supplied to the pot by the water supply device, downstream into the receiving region of the pot adjoining the inner region of the holding device. It is also conceivable for the inlet opening formed in the lid and the passage formed in the holding device, also in the first position of the holding device in the pot, to be arranged in such a manner relative to one another that, if no coffee pad is received in the holding device, a water jet of the water supplied to the pot from the water supply device through the inlet opening in the lid passes through the passage of the holding device and into the receiving region of the pot without first striking the inner region of the holding element. For this, the inlet opening can be formed and arranged centrally in a, for example, square or round lid and the passage can be formed and arranged centrally in a, likewise, square or round holding device.

In a further advantageous embodiment, the pot of the galley drink preparation device has a substantially square or rectangular cross-section. In order to avoid injuries, it is conceivable for the pot to have rounded edges and corners. In a particularly advantageous embodiment of the pot of the galley drink preparation device, an indentation, in which a handle is arranged, is formed in a generated surface of the receiving region. The handle can be arranged and formed in the indentation of the generated surface in such a manner that, in a parallel projection of the pot taken perpendicular to the base of the pot, the handle does not lie outside the projected area of the receiving region of the pot. The substantially square or rectangular cross-section of the pot enables a space-saving positioning of a plurality of pots side by side. A space, present in the galley drink preparation device, for receiving a plurality of such pots can thus be efficiently utilised.

In a further advantageous configuration of the galley drink preparation device, the water supply device comprises a flow heater. Fresh water from a central fresh-water supply system of the aircraft can be supplied to the flow heater, heated in the flow heater and delivered to the pot immediately after heating in the flow heater. Such a design of the water supply device makes it possible to dispense with a hot-water tank for storing previously heated water. This has the advantage that both energy and space in the galley drink preparation device can be saved.

According to a further advantageous embodiment, the galley drink preparation device has a receiving space for receiving a plurality of pots. For receiving the plurality of pots, the receiving space can comprise a pull-out drawer. The drawer can be configured in such a manner that a plurality of pots can be positioned in it in a space-saving manner. It is, however, also conceivable to provide, instead of the pull-out drawer, a tray which can be inserted into the receiving space and on which a plurality of pots can be positioned in a space-saving manner, similar to that in the drawer. The drawer or a tray can ensure correct positioning of the pots in the receiving space of the galley drink preparation device. It is also conceivable for a plurality of drawers or for a plurality of trays insertable into the receiving space to be provided side by side or one behind the other in the receiving space. The installation space freed by the water tank which has been dispensed with can be utilised for the receiving space.

Furthermore, the water supply device of the galley drink preparation device may comprise a water supply pipe which extends into the receiving space of the galley drink preparation device. The water supply pipe of the water supply device can have a number of branches corresponding to the number of pots which are receivable in the receiving space. Advantageously, the branches of the water supply pipe of the water supply device are arranged and configured in such a manner that hot water is supplyable from a branch of the water supply pipe of the water supply device to each of the pots received in the receiving space of the galley drink preparation device during the drinks preparation.

In addition, it is advantageous when the galley drink preparation device comprises a control unit which controls the supply of hot water from the branches of the water supply pipe of the water supply device into the pots received in the receiving space during the drinks preparation. The control unit can control the delivery of hot water from the branches of the water supply pipe of the water supply device to the pots received in the receiving space by means of signals, for example sensor signals. It is also conceivable for the control unit to monitor the filling level of the pots received in the receiving space during the drinks preparation, so that overflowing of the pots and consequently also the associated risk of injury can be avoided. In the case where a plurality of drawers or insertable trays are arranged in the receiving space, the control unit can be configured to control the supply of hot water into the pots received in the drawers or trays separately for each drawer or tray. It is also conceivable for the control unit to be configured to control the supply of hot water into the pots received in the receiving space separately for each of the pots, for example by means of suitable valves provided in the branches of the water supply pipe.

BRIEF DESCRIPTION OF THE DRAWINGS

The galley drink preparation device according to the invention is explained in detail below with reference to the appended schematic figures.

DETAILED DESCRIPTION

Figure 3:
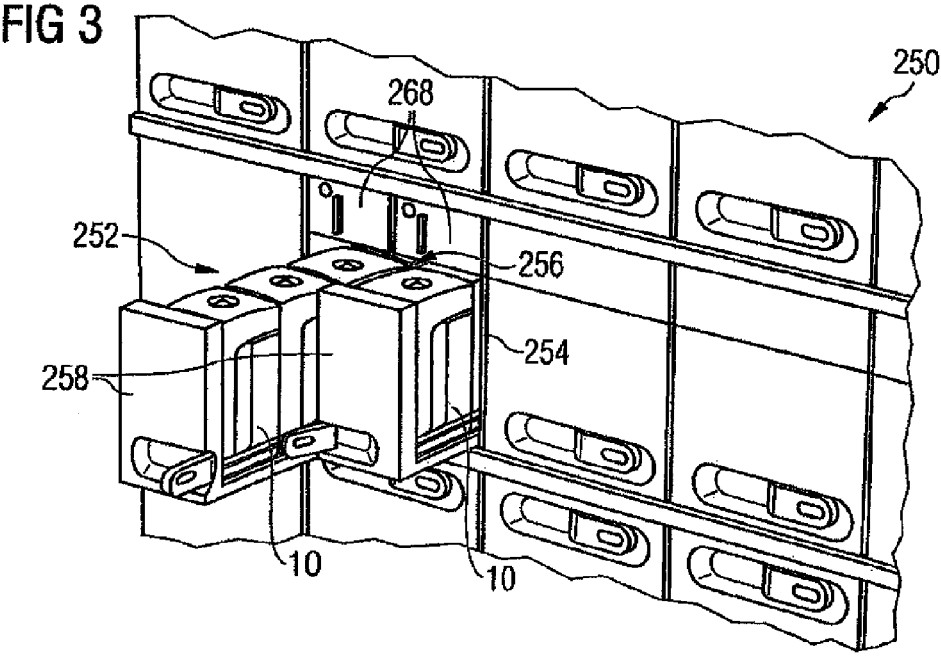
FIG. 3 shows an embodiment of the galley drink preparation device which is installed as a module in an aircraft galley of modular design.
Figure 4:
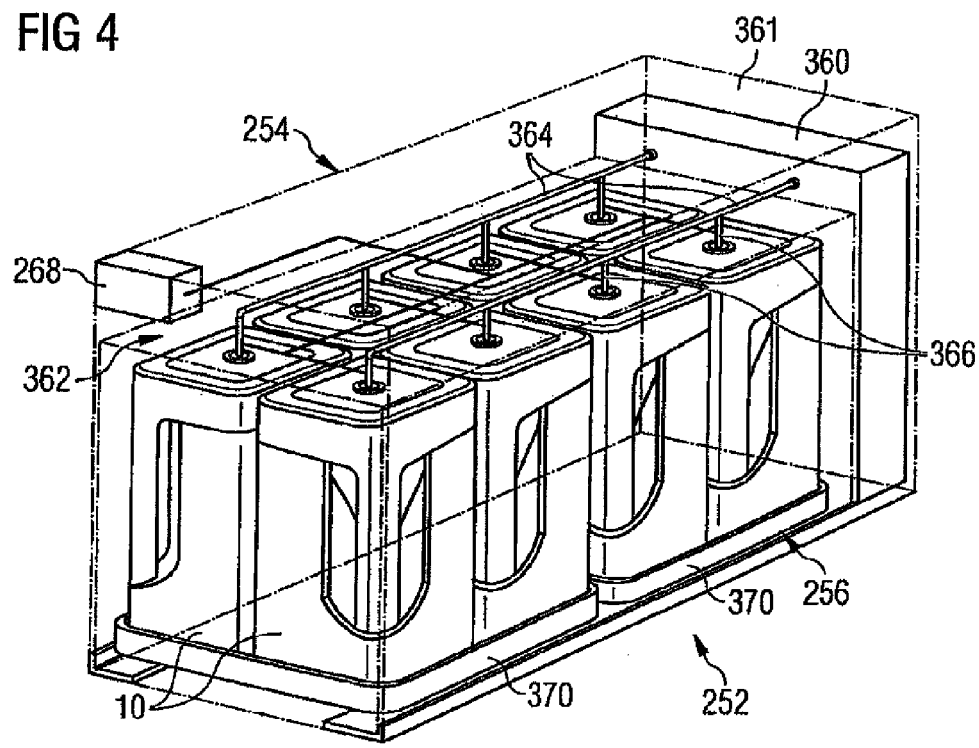
FIG. 4 shows a further embodiment of a galley drink preparation device configured as a modular unit for installation in the galley of modular design according to FIG. 3.

FIGS. 1A to 1D show a pot 10 of a galley drink preparation device 252 illustrated in FIGS. 3 and 4 for the preparation of drinks on board an aircraft. The pot 10 comprises a receiving region 12 for receiving the drink to be prepared in the galley drink preparation device 252. In the embodiment of the pot 10 illustrated in FIGS. 1A to 1D, a top part 14 and a handle 16 is formed integrally with the receiving region 12. The pot 10 has a substantially square cross-section, the four edges of the pot 10 being configured as rounded edges.

The handle 16 is formed in the region of one of the rounded edges. In order to enable simple holding of the pot 10 at the handle 16, an indentation is formed in the region of the handle 16 in a generated surface 18 of the pot 10. The indentation forms an engaging region which enables one hand to grasp around the handle 16. The handle 16 is consequently connected to the receiving region 12 of the pot 10 and to the top part 14 of the pot 10.

The top part 14 has, in accordance with the square cross-section of the pot 10, four corner regions. In the corner region which is diagonally opposite the rounded edge of the pot 10 on which the handle element 16 is formed, a spout 20 of the pot 10 is formed in the top part 14. The spout 20 is configured as a connecting opening between the receiving region 12 of the pot 10 and a pot environment and has a circular flow cross-section. The spout 20 enables a drink received in the receiving region 12 of the pot 10 to be poured out of the pot 10.

Figure 2:
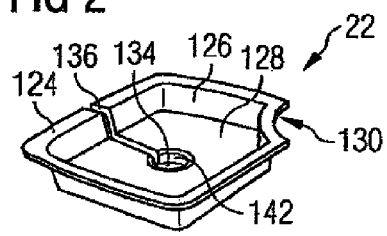
FIG. 2 shows the holding device which is positionable in the pot according to FIGS. 1A to 1D.

The top part 14 of the pot 10 has a web (not illustrated) for supporting a holding device 22, illustrated schematically in FIG. 2, in the top part 14 of the pot 10. The holding device 22 comprises a border region 124 and an inner region 128 connected to the border region 124 by a side-wall region 126. Apart from the rounded corners of the holding device 22, of which one rounded corner 130 is provided with a recess, the cross-section of the holding device 22 is likewise square. The holding device 22 is positionable in the pot 10 in such a manner that the rounded corner 130, provided with a recess, of the holding device 22 is adjacent to the corner region of the top part 14 in which the spout 20 is arranged and formed. The corner region of the top part 14 in which the spout 20 is arranged and formed has a shape and size which is matched to the shape and size of the recess formed in the region of the corner 130 of the holding device 22.

Furthermore, a passage 134 with a circular flow cross-section is formed centrally in the inner region 128 of the holding device 22. In addition, the holding device 22 has a slot 136 which extends from the border region 124 through the side-wall region 126 and the inner region 128 to the passage 134. Furthermore, the holding device 22 comprises a tubular projection 142 surrounding the passage 134. The tubular projection 142 extends from the border region 124 of the holding device 22, starting from the inner region 128 of the holding device 22. The slot 136 of the holding device 22 also extends into the tubular projection 142 surrounding the passage 134.

Furthermore, the pot 10 has a lid 38. The lid 38 is of substantially square shape. It has three rounded corners and one rounded corner provided with a recess. The lid 38 is pivotably coupled to the top part 14 at one edge. In its closed state, the lid 38 covers the region of the top part 14 in which the holding device 22 is positionable. When the lid 38 is closed, the rounded corner of the lid 38 provided with a recess is adjacent to the corner region of the top part 14 in which the spout 20 is arranged and formed. Furthermore, an inlet opening 40 with a circular flow cross-section is formed centrally in the lid 38. In the closed state of the lid 38, the inlet opening 40 is aligned with the passage 134 of the holding device 22 when the holding device 22 is positioned in the top part 14.

Figure 1A:
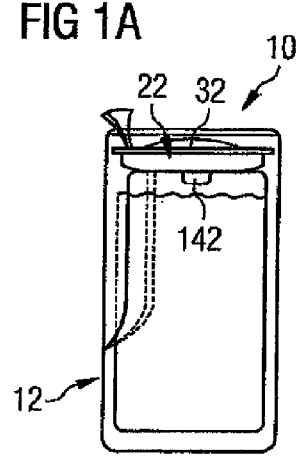
FIGS. 1A and 1B show a pot of a galley drink preparation device, in which a holding device is positioned in a first position.
Figure 1C:
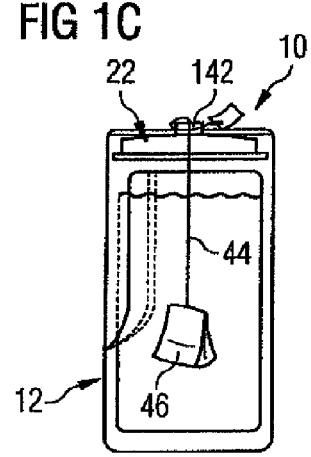
FIGS. 1C and 1D show a pot of the galley drink preparation device, in which a holding device is positioned in a second position.
Figure 1B:
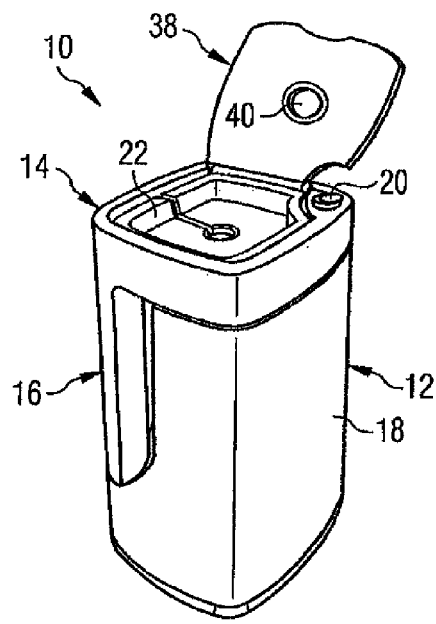
Figure 1D:
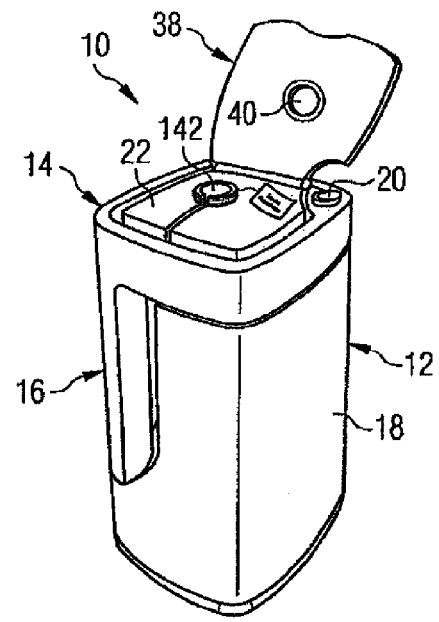

As becomes clear in particular from FIGS. 1B and 1D, the holding device 22 can be positioned in the top part 14 of the pot 10 in two positions. In FIGS. 1A and 1B, the holding device 22 is positioned and supported in the top part 14 of the pot 10 in its first position. In this first position, the holding device 22 serves to receive a coffee pad 32. In the first position of the holding device 22 in the top part 14 of the pot 10, the tubular projection 142 which surrounds the passage 134 of the holding device 22 extends in the direction of the receiving region 12 of the pot 10.

If hot water is supplied to the pot 10 through the inlet opening 40 in the lid 38, the hot water passes firstly into the region of the holding device 22 and flows through the coffee pad 32 received in the holding device 22. Subsequently, the hot water supplied to the pot emerges in the form of prepared coffee from the coffee pad 32 in the direction of the inner region 128 of the holding device 22. The prepared coffee finally passes through the passage 134 and the tubular projection 142 of the holding device 22 surrounding the passage 134 into the receiving region 12 of the pot 10.

In the second position of the holding device 22 in the top part 14 of the pot 10 illustrated in FIGS. 1C and 1D, the tubular projection 142 which surrounds the passage 134 of the holding device 22 extends into the inlet opening 40 of the lid 38 of the pot 10 when the lid 38 is closed.

The positioning of the holding device 22 in the top part 14 of the pot 10 illustrated in FIGS. 1C and 1D serves for the preparation of tea. Before the holding device 22 is inserted into the top part 14, a string 44 of a tea bag 46 is introduced through the slot 136 of the holding device 22 into the passage 134 and fastened to the passage 134 by winding several times around the projection 142 surrounding the passage 134. Subsequently, the holding device 22 is positioned in the top part 14 in its second position. The tea bag 46 reaches into the receiving region 12 of the pot 10.

When the holding device 22 is positioned in the top part 14 of the pot 10 in its second position, hot water supplied to the pot 10 through the inlet opening 40 of the lid 38 passes through the tubular projection 142 of the holding device 22 surrounding the passage, without dwelling in the holding device 22, into the receiving region 12 of the pot 10. The tea preparation consequently takes place only in the receiving region 12 of the pot 10. The tea bag 46 is soaked by the hot water supplied to the pot 10 and remains in the hot water received in the receiving region 12 of the pot 10 for a desired tea infusion time. In contrast to the coffee preparation which takes place in the holding device 22, the tea preparation thus takes place in the receiving region 12 of the pot 10.

FIG. 3 shows a galley drink preparation device 252 configured as a modular unit of a galley 250 of modular design. The galley drink preparation device 252 comprises a housing 254, the shape and size of which is matched to the modular design of the aircraft galley 250. In a receiving space 256 of the galley drink preparation device 252, two pull-out drawers 258 are arranged side by side. The two drawers 258 are coupled to the housing 254 of the galley drink preparation device 252 by means of extension rails (not illustrated). The extension rails enable the drawers 258 to be individually pulled out of the receiving space 256 of the galley drink preparation device 252 for loading with or unloading of pots 10.

Each drawer 258 of the galley drink preparation device 252 can be equipped with a plurality of pots 10, the shape and size of the pots 10 being matched to the receiving space 256 and the drawers 258, and the pots 10 being receivable in a row in each case one behind the other in each of the two drawers 258.

As can be seen in FIG. 4, a flow heater 360 is arranged at a rear wall of the housing 254 of the galley drink preparation device 252. The flow heater 360 extends in FIG. 4 along the rear wall 361 of the housing 254 and is cuboid-shaped. The flow heater 360 is thus arranged in a space-saving manner and over a large area in the housing 254. The large-area design of the flow heater 360 enables particularly rapid heating of the water led through the flow heater 360.

The flow heater 360 comprises an inflow pipe (not illustrated) for supplying fresh water from a central fresh-water system of the aircraft. Starting from and connected to the flow heater 360, two hot-water pipes 364 are arranged in a ceiling region of the housing 254 of the galley drink preparation device 252, running parallel to one another and extending in the direction of a module front 362.

The receiving space 256 of the galley drink preparation device 252 provides space for eight pots 10 according to FIG. 4. These eight pots 10 are arranged in the receiving space 256 in two rows of four pots. The two water supply pipes 364 extend in FIG. 4 above the pots 10 received in the receiving space 256 of the galley drink preparation device 252 in two rows of four pots. One water supply pipe 364 feeds respectively one of the two rows of pots. Each of the two water supply pipes 364 has, for supplying hot water into each of the four pots 10 per row, one branch 366 per pot 10. The pots 10 are received in the receiving space 256 of the galley drink preparation device 252, and the branches 366 of the water pipes 364 are configured and arranged in the galley drink preparation device 252, in such a manner that hot water from the two hot-water supply pipes 364 can be supplied to each of the eight pots 10 illustrated in FIG. 4.

In the embodiment of the modular unit of the galley drink preparation device 252 illustrated in FIG. 4, the eight pots 10 received in the receiving space 256 of the galley drink preparation device 252 are positioned in two trays 370. Each of the two trays 370 receives four adjacent pots 10. The two trays 370 according to FIG. 4 have a substantially square cross-section with rounded corners, so that four pots 10 are receivable in a tray 370. The shape and size of the pots 10 is matched to the trays 370. The two trays 370 can be inserted one after the other into the receiving space 256 of the galley drink preparation device 252. The pots 10 are positioned in the trays 370 inserted into the receiving space 256 in such a manner that hot water is supplyable to each pot 10 through a branch 366 of the hot-water supply pipes 364.

Furthermore, the galley drink preparation device 252 comprises a control unit 268 which is connected to each branch 366 of the water supply pipes 364 for controlling the water supply from the water pipes 364 into the pots 10.

According to the embodiment of the modular unit of the galley drink preparation device 252 illustrated in FIG. 3, the galley drink preparation device 252 has a separate control unit 268 for each drawer 258. According to FIG. 3, the water supply into the pots 10 is controlled by a separate control unit 268 for each of the two drawers 258.

The invention claimed is:

1. A galley drink preparation device for the preparation of drinks on board an aircraft, having:
a water supply device and
a pot which comprises an inlet opening for supplying water from the water supply device into the pot and a receiving region for receiving the drink to be prepared in the galley drink preparation device,
wherein the pot comprises a holding device which is arranged, in relation to a flow direction of the water supplied to the pot by the water supply device, downstream of the inlet opening and is set up to receive a coffee pad, and wherein an indentation, in which a handle is arranged, is formed in a generated surface of the receiving region of the pot, and wherein the holding device comprises a border region and an inner region connected to the border region by a side-wall region, the holding device being adapted to be positioned in a first position in such a manner that the inner region is lowered relative to the border region for receiving a coffee pad, and being adapted to be positioned in a second position in such a manner that the inner region is raised relative to the border region.

2. The galley drink preparation device according to claim 1, wherein the pot has a spout which is shaped and arranged in such a manner that the drink received in the receiving region of the pot is led past the holding device and a coffee pad received in the holding device when being poured out of the pot.

3. The galley drink preparation device according to claim 2, wherein the spout is formed in a border region of a top part of the pot, which region is arranged, in relation to the flow direction of the water supplied to the pot by the water supply device, upstream of the receiving region for receiving the drink to be prepared in the galley drink preparation device, and receives the holding device.

4. The galley drink preparation device according to claim 1, wherein the top part of the pot comprises a web which supports the border region-of the holding device when the holding device is received in the top part in its first or its second position.

5. The galley drink preparation device according to claim 1, wherein the holding device is provided with a passage in its inner region, and has a slot, the slot extending from the border region through the side-wall region and the inner region to the passage.

6. The galley drink preparation device according to claim 1, wherein the holding device has a tubular projection surrounding the passage, which projection extends, in relation to a flow direction of the water supplied to the pot by the water supply device, upstream of the inner region of the holding device when the holding device is positioned in its second position.

7. The galley drink preparation device according to claim 1, wherein the pot comprises a lid which is pivotably fastened in such a manner that it covers the holding device in its closed state, the inlet opening for supplying water from the water supply device into the pot being formed in the lid.

8. The galley drink preparation device according to claim 6, wherein the inlet opening formed in the lid is shaped and arranged in such a manner that the tubular projection formed on the holding device is receivable in the inlet opening when the holding device is positioned in its second position and the lid is closed.

9. The galley drink preparation device according to claim 1, wherein the pot has a substantially square or rectangular cross-section.

10. The galley drink preparation device according to claim 1, wherein the water supply device comprises a flow heater.

11. The galley drink preparation device according to claim 1, having a receiving space for receiving a plurality of pots.

12. The galley drink preparation device according to claim 11, wherein the water supply device comprises a water supply pipe which has a number of branches corresponding to the number of pots which are receivable in the receiving space.

* * * * *